(12) United States Patent
Alladi et al.

(10) Patent No.: US 7,664,993 B2
(45) Date of Patent: Feb. 16, 2010

(54) AUTOMATION OF TESTING IN REMOTE SESSIONS

(75) Inventors: Mahadeva Alladi, Redmond, WA (US); Thirunavukkarasu Elangovan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 11/679,620

(22) Filed: Feb. 27, 2007

(65) Prior Publication Data

US 2008/0209270 A1 Aug. 28, 2008

(51) Int. Cl.
G06F 11/00 (2006.01)

(52) U.S. Cl. .................................................. 714/44
(58) Field of Classification Search .................. 714/44
See application file for complete search history.

(56) References Cited

U.S. PATENT DOCUMENTS

| 6,263,456 | B1 * | 7/2001 | Boxall et al. ................. 714/31 |
| 8,567,767 | | 5/2003 | Mackey et al. |
| 6,691,259 | B1 * | 2/2004 | Mackey et al. ............... 714/46 |
| 6,757,849 | B2 * | 6/2004 | Balluff ......................... 714/44 |
| 6,941,492 | B1 * | 9/2005 | Ezra et al. ..................... 714/38 |
| 7,103,772 | B2 | 9/2006 | Jorgensen et al. |
| 7,577,872 | B2 * | 8/2009 | DiBartolomeo et al. ..... 714/27 |
| 2002/0056047 | A1 * | 5/2002 | Lehman ....................... 713/200 |
| 2004/0064762 | A1 * | 4/2004 | Deshpande et al. .......... 714/44 |
| 2004/0153775 | A1 * | 8/2004 | Bhattacharjee et al. ...... 714/25 |
| 2005/0080915 | A1 | 4/2005 | Shoemaker et al. |
| 2005/0251855 | A1 | 11/2005 | Brandstatter |
| 2006/0069797 | A1 | 3/2006 | Abdo et al. |
| 2006/0075105 | A1 | 4/2006 | Momtchilov et al. |
| 2006/0112181 | A1 | 5/2006 | Affaki |
| 2006/0142878 | A1 | 6/2006 | Banik et al. |
| 2006/0230438 | A1 | 10/2006 | Shappir et al. |

OTHER PUBLICATIONS

Balmer, et al., "Analysis of Terminal Server Architectures for Thin Clients in a High Assurance Network" retrieved on available as early as Dec. 5, 2006, at <<http://csrc.ncsi.nist.gov/nissc/2000/proceedings/papers/037.pdf>>, pp. 11.

Nieh, et al., "A Comparison of Thin-Client Computing Architectures", retrieved on available as early as Dec. 5, 2006, at <<http://www.ncl.cs.columbia.edu/publications/cucs-022-00.pdf>>, Columbia University, Nov. 2000, pp. 1-16.

Schmidt, et al., "The Interactive Performance of SLIM: a Stateless, Thin-Client Architecture", retrieved at <<http:// research.sun.com/features/tenyears/voicd/papers/Nrthcutt.pdf>>, 17th ACM Symposium on Operating Systems Principles, SOSP-17 Dec. 1999, ACM 1-58113-140-2/99/0012, Dec. 1999, pp. 32-47.

* cited by examiner

Primary Examiner—Michael C Maskulinski
(74) Attorney, Agent, or Firm—Lee & Hayes, PLLC (57) ABSTRACT

Systems and methods are described for implementing automation of testing in remote sessions. In an implementation, a test agent is deployed at a remote server to automate testing of various components in a remote session between the remote server and a remote client. The test agent enables automation, synchronization and monitoring of test commands between the remote client and the remote server. The test agent communicates with test applications deployed at the remote client to test the components in the remote session.

18 Claims, 6 Drawing Sheets

AUTOMATION OF TESTING IN REMOTE SESSIONS

BACKGROUND

In typical remote systems, remote computing devices are connected to servers from a distant location. Often, it may be necessary to test various features of the remote computing devices and the servers, after establishing a remote connection between the remote computing devices and the servers. Typical test automation tools may use manual inputs that can involve keyboard and mouse inputs to test the various features. This can become unreliable during testing operations due to timing issues and string dependencies. Furthermore, a new set of instructions may have to be written for the remote computing devices and the servers for each new feature to be tested. This may further mean that custom components are to be implemented on the server side and the computing device side for every new test. This can lead to a great consumption of time and resources.

SUMMARY

This summary is provided to introduce simplified concepts of implementing automation of testing in remote sessions, which is further described below in the Detailed Description. This summary is not intended to identify essential features of the claimed subject matter, nor is it intended for use in determining the scope of the claimed subject matter.

In an embodiment, a remote session is established between a server and one or more client or computing devices. Test inputs are sent for testing a specific component that uses specific plug-ins for the testing. The test in conducted and monitored using the component specific plug-ins.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The following disclosure describes systems and methods for implementing automation of testing in remote sessions. More particularly, the systems and methods include deploying a test agent at a remote server to automate testing of various components in a remote session between the remote server and a remote client. The test agent enables automation, synchronization and monitoring of test commands between the remote client and the remote server. The test agent communicates with test applications deployed at the remote client to test the components in the remote session. Moreover, plug-ins can be added to the test agent to test new or modified components in the remote session.

While aspects of described systems and methods for automation of testing in remote sessions can be implemented in any number of different computing systems, environments, and/or configurations, embodiments are described in the context of the following exemplary system architectures.

Exemplary System

Figure 1:
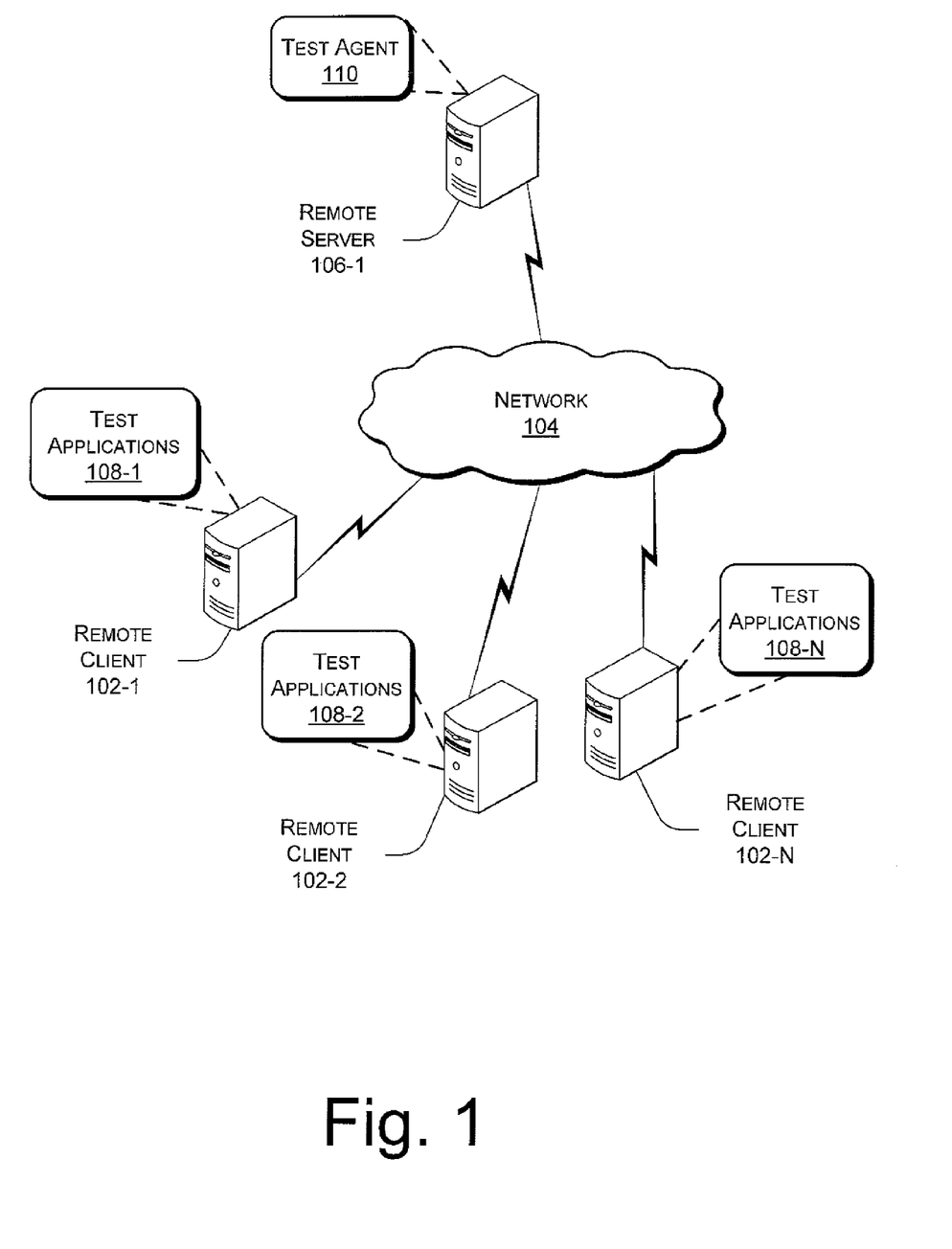
FIG. 1 is an illustration of an exemplary system for implementing automation of testing in remote sessions.

FIG. 1 illustrates an exemplary system 100 for implementing automation of testing in remote sessions. The system 100 includes remote clients 102-1, 102-2 . . . 102-N (i.e., clients 102) associated through a network 104 with a remote server 106.

The remote clients 102 may include conventional computing devices, including, for example, a server, a desktop PC, a notebook or portable computer, a workstation, a mainframe computer, a mobile computing device, an Internet appliance, a kiosk, etc.

The network 104 may be a wireless or a wired network, or a combination thereof. The network 104 can be a collection of individual networks, interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs).

The remote server 106 can be any of a variety of servers that can provide remote clients 102 access to various applications and resources associated with the remote server 106. For example, the remote server 106 can be a terminal server that provides the remote clients 102 access to applications or data stored on private computing devices within a private network. In another example, the remote server 106 can be an e-mail server that provides the remote clients 102 access to e-mail, messenger, and other applications.

In an exemplary implementation, the remote client 102 includes test applications 108 that provide a framework for testing various components on the remote client 102 and the remote server 106. The remote server 106 includes a test agent 110 that implements and monitors testing of the various components. The test agent 110 uses various plug-ins to conduct various tests such as, for example, printer test, audio test, auto-reconnect test, file redirection test, etc. In other words, one or more plug-ins may be associated with a particular test for a particular component (i.e., component under test). The various components tested can be associated with either the remote client or the remote server. Components under test are further described below.

In operation, the remote client 102 may establish a remote session with the remote server 106 through the network 104. To test operation of a particular component in the remote session, the test applications 108 provide test inputs that are communicated to the test agent 110 and to the component. The test agent 110 monitors the functioning of the component under test using plug-ins for the component and provides a test report to the test applications 108.

Exemplary Remote Client

Figure 2:
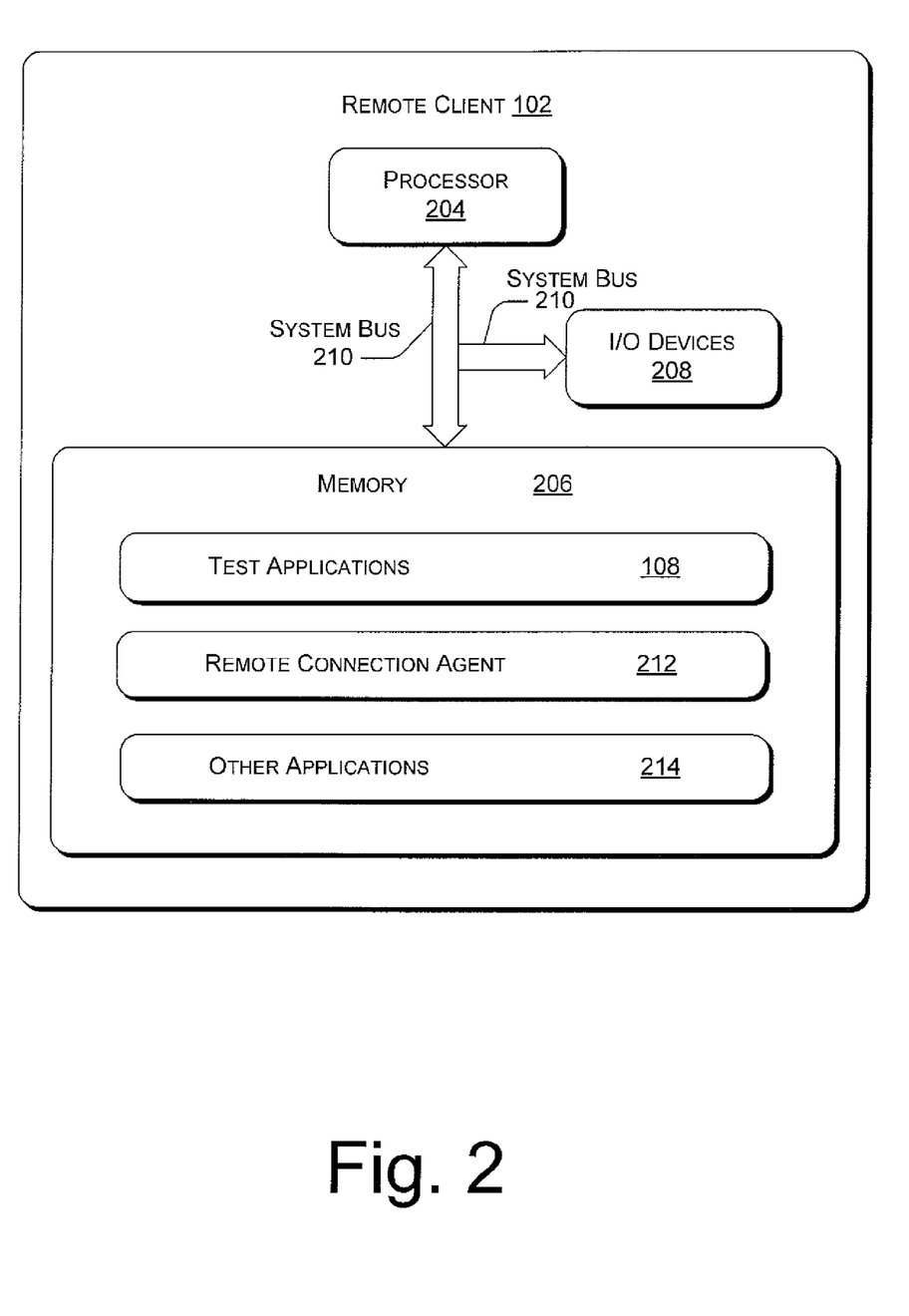
FIG. 2 is an illustration of an exemplary implementation of a remote client server.

FIG. 2 illustrates an exemplary remote client 102. Exemplary working of the remote client 102 to implement automation of testing in remote sessions as described with reference to FIG. 1. The remote client 102 can include one or more processor(s) 204, a memory 206, input/output (I/O) devices 208 (e.g., keyboard, display, and mouse), and a system bus 210 operatively coupling various components of the remote client 102.

System bus 210 represents any of several types of bus structures, including a memory bus or memory controller, a peripheral bus, an accelerated graphics port, and a processor or local bus using any of a variety of bus architectures. By way of example, such architectures can include an industry standard architecture (ISA) bus, a micro channel architecture (MCA) bus, an enhanced ISA (EISA) bus, a video electronics standards association (VESA) local bus, a peripheral component interconnects (PCI) bus also known as a mezzanine bus, a PCI express bus, a universal serial bus (USB), a secure digital (SD) bus, or an IEEE 1294 (i.e., FireWire) bus.

Memory 206 can include computer-readable media in the form of volatile memory, such as RAM and/or non-volatile memory, such as ROM, or flash RAM. Memory 206 typically includes data and/or program modules for implementing automation of testing over remote sessions, which are immediately accessible to and/or presently operated on by processor 204. In an embodiment, memory 206 includes test applications 108, a remote connection agent 212, and other applications 214.

The remote connection agent 212 can establish a remote session with the remote server 106. The remote session can be established on a virtual channel that handles custom data formats independently from a communication protocol (e.g., SSL, RDP, etc.). The virtual channel can be, for example, a socket communication channel between the remote client 102 and the remote server 106. Furthermore, the remote session can leverage an existing communication protocol between the remote client 102 and the remote server 106. Therefore, a remote session does not have to be established in a separate clamped down environment.

In an exemplary implementation, the remote connection agent 212 is a terminal server client (i.e., TS client) that uses an application such as Microsoft® Terminal Services Command Executive (i.e., mstsc.exe) to establish a remote session over remote desktop protocol (RDP) with a terminal server.

The remote connection agent 212 may receive test inputs from the test applications 108 to test a particular component in the remote session. The remote connection agent 212 sends the test inputs to the test agent 110 of the remote server 106. The test agent 110 communicates the test inputs to the component under test and monitors the functioning of the component. The test agent 110 can generate a test report and send the test report to the remote connection agent 212.

The test report includes details such as whether the test was conducted successfully, test outputs that were obtained during the testing of the component, etc. The remote connection agent 212 communicates the test report to the test applications 108. The test applications 108 can store the report in a database for further processing and can also initiate further tests based on the report.

Exemplary Remote Server

Figure 3:
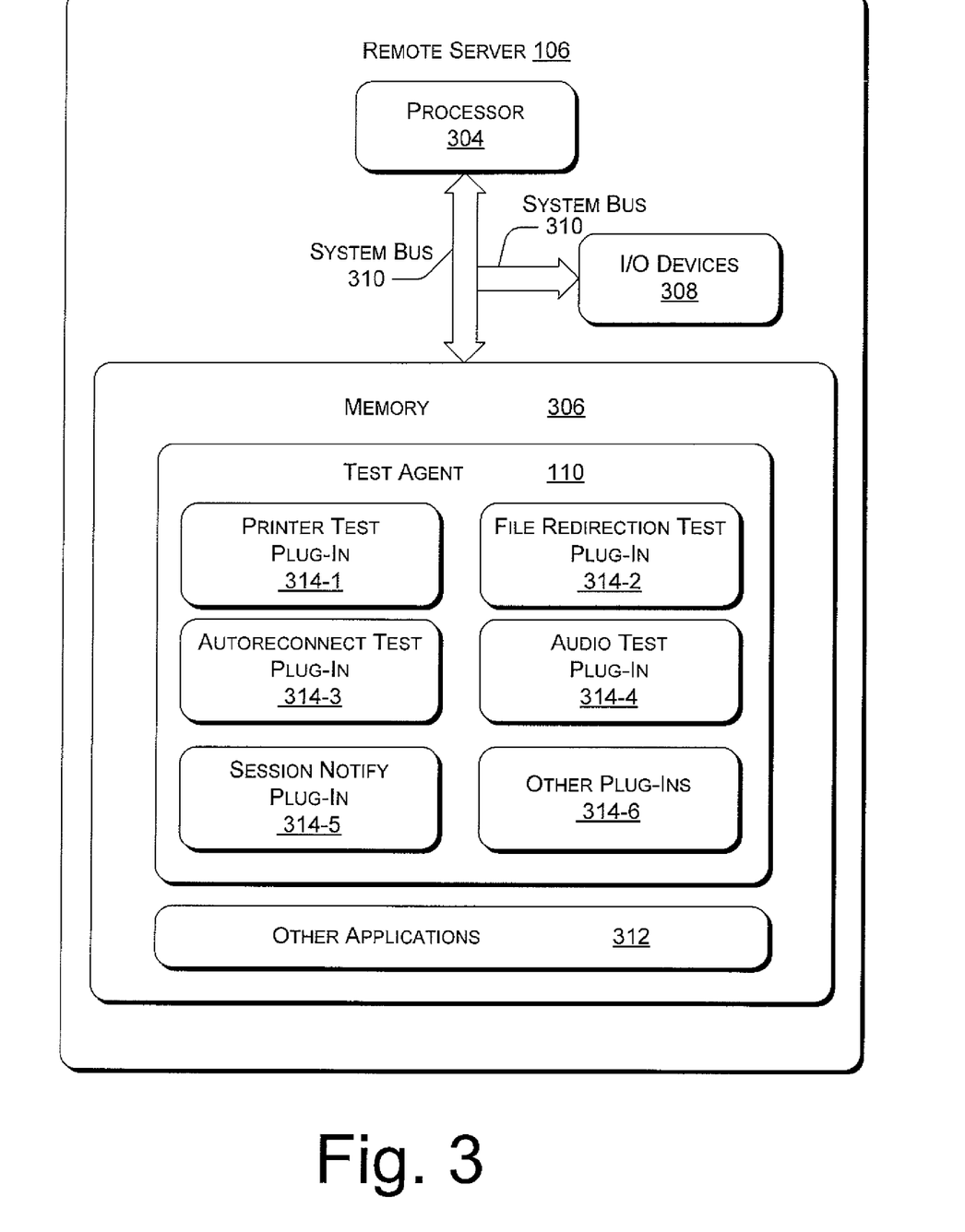
FIG. 3 is an illustration of an exemplary implementation of a remote server.

FIG. 3 illustrates an exemplary remote server 106. Exemplary working of the remote server 106 for implementing automation of testing in remote sessions is described with reference to FIGS. 1 and 2. The remote server 106 can include one or more processor(s) 304, a memory 306, input/output (I/O) devices 308 (e.g., keyboard, display, and mouse), and a system bus 310 operatively coupling various components of the remote server 106.

System bus 310 represents any of several types of bus structures, including a memory bus or memory controller, a peripheral bus, an accelerated graphics port, and a processor or local bus using any of a variety of bus architectures. By way of example, such architectures can include an industry standard architecture (ISA) bus, a micro channel architecture (MCA) bus, an enhanced ISA (EISA) bus, a video electronics standards association (VESA) local bus, a peripheral component interconnects (PCI) bus also known as a mezzanine bus, a PCI express bus, a universal serial bus (USB), a secure digital (SD) bus, or an IEEE 1394 (i.e., FireWire) bus.

Memory 306 can include computer-readable media in the form of volatile memory, such as RAM and/or non-volatile memory, such as ROM, or flash RAM. Memory 306 typically includes data and/or program modules for implementing automation of testing over remote sessions, which are immediately accessible to and/or presently operated on by processor 304.

Memory 306 can include test agent 110 and other applications 312. Further, the test agent 110 includes various plug-ins 314 such as, for example printer test plug-in 314-1, file redirection test plug-in 314-2, auto-reconnect test plug-in 314-3, audio test plug-in 314-4, session notify plug-in 314-5 and other plug-ins 314-6.

In operation, the test agent 110 receives test inputs from the remote connection agent 212 for testing a particular component in a remote session between the remote client 102 and the remote server 106. The test agent 110 communicates the test inputs to the component under test and to one or more plug-ins 314 that relate to the component under test. Further, the test agent 110 uses the one or more plug-ins 314 that relate to the component to implement the test and monitor the functioning of the component.

In an example, a printer test plug-in 314-1 can be used to test operations of a printer configured at the remote client 102 and associated with the remote server 106. When test inputs including a print command are received by the test agent 110, the test agent 110 uses the printer test plug-in 314-1 along with other plug-ins 314-6 to determine whether the printer is correctly configured, whether files are redirected correctly to the printer, etc. In this example, the printer is considered as a component under test.

In another example, a file redirection test plug-in 314-2 can be used along with other plug-ins 314-6 to test whether files on local drives of the remote client 102 are redirected correctly in the remote session, so that the remote client 102 can access the files in the remote session. In this example, redirection of the files on the local drives is considered as a component under test.

In another scenario, an auto-reconnect plug-in 314-3 can be used along with other plug-ins 314-6 to test auto-reconnection of the remote session. The auto-reconnect plug-in 314-3 can be given test inputs such that the network 104 is disabled temporarily and then enabled. The auto-reconnect plug-in 314-3 can determine whether the remote session was re-established automatically once the network 104 was enabled. In this example, the auto-reconnection of the remote session is considered as a component under test.

In another scenario, an audio test plug-in 312-4 can be used along with other plug-ins 314-6 to test whether audio files can be played correctly from the remote server 106 in the remote session. In this example, correct playing of the audio files is considered as a component under test.

The test agent 110 may also use the plug-ins 314 to generate a test report for the test conducted on the component under test. The test report can include details such as whether the test was conducted successfully, test outputs that were obtained during the testing, etc. The test agent 110 can send the test report to the remote connection agent 212 of the remote client 102.

When a new or modified component in the remote session is to be tested, one or more plug-ins can be added to the test agent 110 that can implement and monitor testing of the new or modified component. Furthermore, a plug-in that is common to different components can be shared and used during testing of each of the components.

For example, a session notify plug-in 314-5 can be used to notify session-start and session-end details of remote clients 102. The session notify plug-in 314-5 can be a component independent plug-in and can be used while testing different components. Therefore, for testing a new component, plug-ins specific to the new component can be added and other common plug-ins can be used from the plug-ins 314 present in the test agent 110.

It will be understood that the test agent 110 can also support testing of multiple components at a time. Moreover, the remote server 106 can be associated with multiple remote clients 102 at a time. In such a case, the test agent 110 can also implement simultaneous testing of different components for the multiple remote clients 102.

Exemplary Data Flow and Methods

Figure 4:
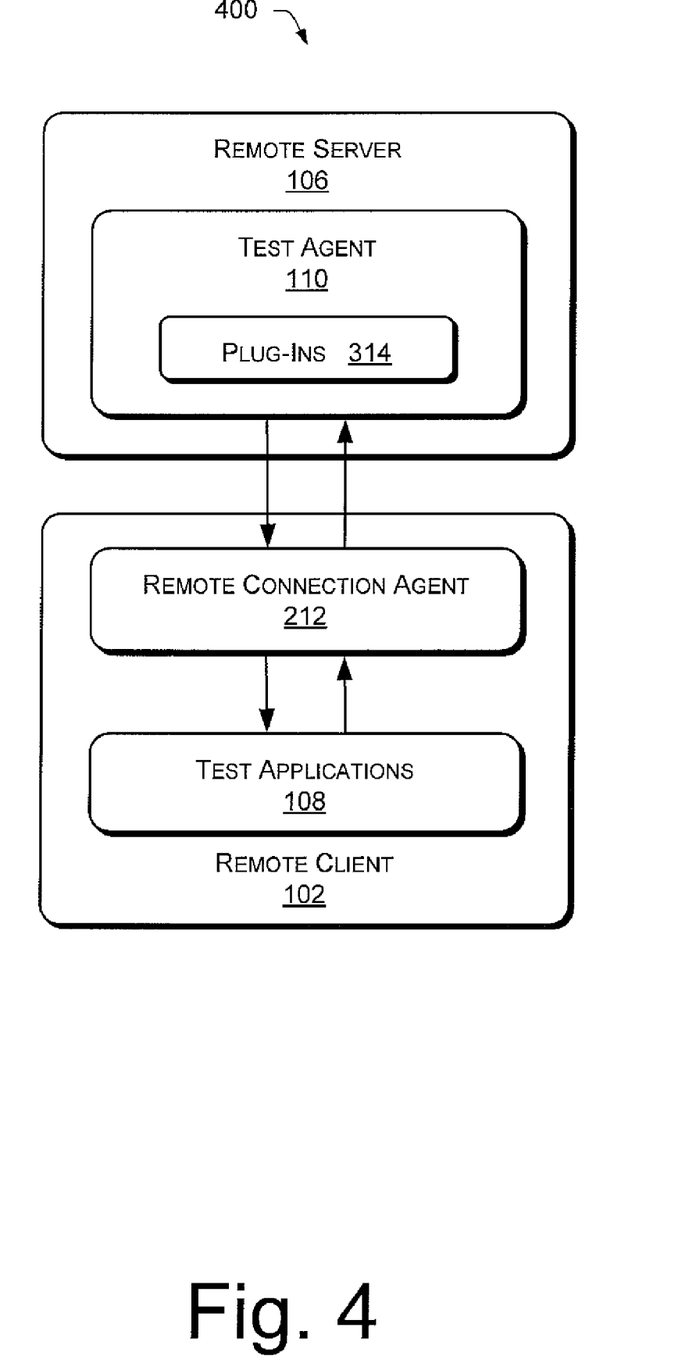
FIG. 4 is an illustration of exemplary data flow between remote client and remote server.

FIG. 4 illustrates exemplary data flow 400 between a remote client and a remote server. For discussion purposes, the data flow 400 is described with reference to the environment 100 shown in FIG. 1, the remote client 102 shown in FIG. 2, and the remote server 106 shown in FIG. 3.

The remote client 102 includes test applications 108 and a remote connection agent 212. The test applications 108 provide a framework for conducting tests on components in a remote session. The remote connection agent 212 establishes the remote session with the remote server 106. The remote server 106 includes a test agent 110, which further includes plug-ins 314. The test agent 110 implements and monitors testing of components in the remote session using the plug-ins 314.

In one implementation, the remote connection agent 212 in the remote client 102 establishes a remote session with the remote server 106. The remote connection agent 212 can establish the remote session using any of various methods known in the art, such as by opening a socket communication channel, or starting a virtual communication channel. Moreover, the remote connection agent can leverage existing communication protocols such as SSL, RDP, etc.

The remote communication agent 212 receives test inputs from the test applications 108. The test applications 108 form a testing framework that can provide automated test inputs for testing a component in the remote session. The test applications 108 include applications for generating test inputs, recording test outputs, providing a user interface for testing, etc. The test applications 108 can generate the test inputs based on user inputs, or from a file, or from recording previously used inputs, or from test outputs, or from any combination of the aforementioned methods. The remote connection agent 212 communicates with the test applications 108 using standard application program interfaces (APIs) known in the art.

The remote connection agent 212 sends the test inputs received from the test applications 108 to the test agent 110 in the remote server 106. The test agent 110 communicates with the remote connection agent 212 using standard APIs known in the art such as windows terminal services (WTS) virtual channel APIs.

The test agent 110 uses plug-ins associated with the component to be tested to conduct and monitor the tests. For example, plug-ins 314 includes plug-ins associated with the component and other plug-ins. The plug-ins 314 can be component specific, or can be generic plug-ins shared by multiple components.

Plug-ins 314 conduct tests on the components based on the test inputs received from the test agent 110 and provide a test report to the test agent 110. The test report includes details of test outputs and other information such as whether the test was successful, where the test failed, etc.

The test agent 110 sends the test report to the remote connection agent 212, which in turn sends the test report to the test applications 108. The test applications 108 can store the test report for future use, and can also initiate further tests based on the test report.

Figure 5:
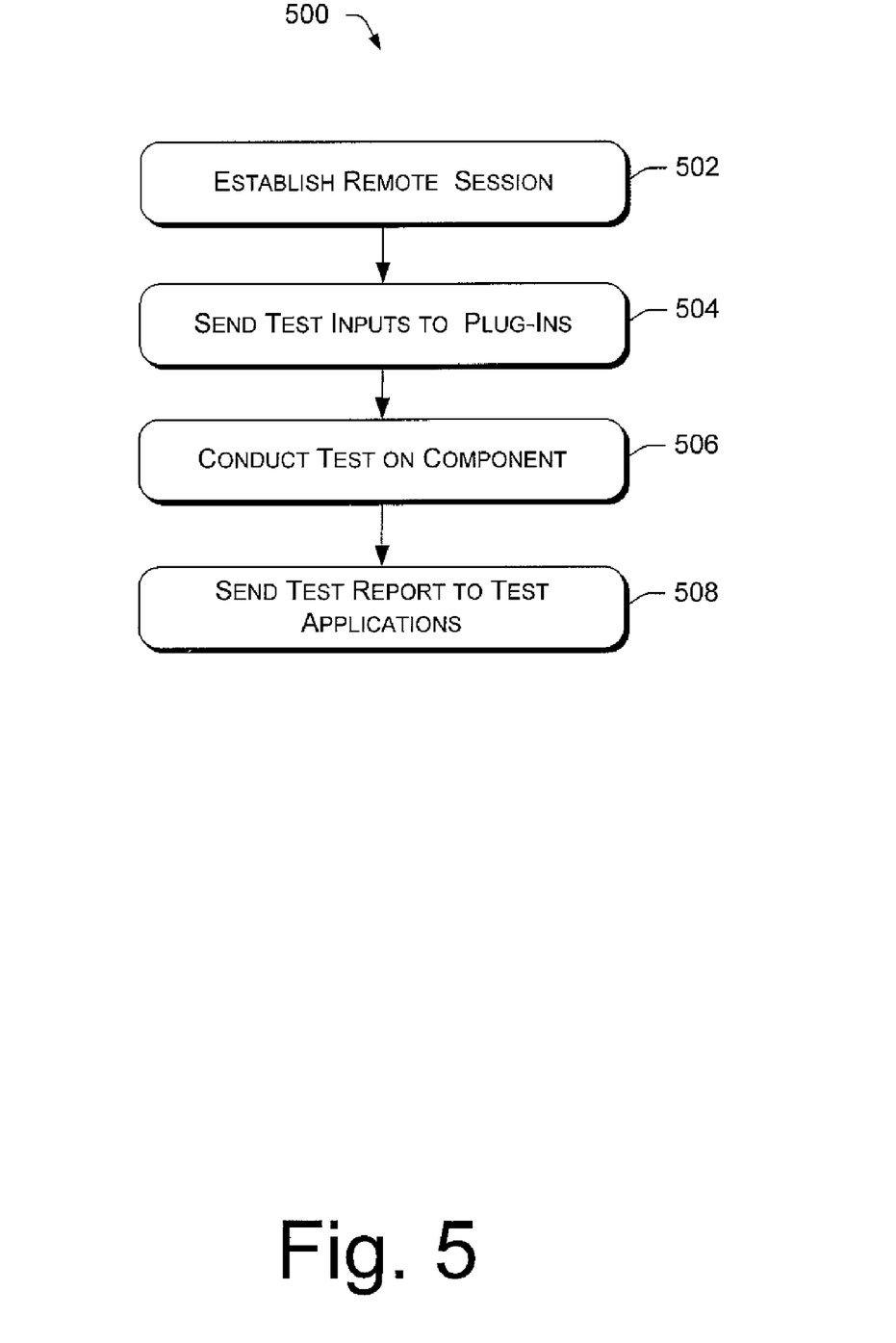
FIG. 5 is a flowchart of an exemplary method of implementing automation of testing in remote sessions.

FIG. 5 illustrates an exemplary method 500 of implementing automation of testing in remote sessions. Process 500 is illustrated as a collection of blocks in a logical flow graph representing a sequence of operations that can be implemented in hardware, software, firmware or a combination thereof. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein.

In the context of software, the blocks represent computer instructions that, when executed by one or more processors, perform the recited operations. For discussion purposes, the process 500 is described with reference to the environment 100 shown in FIG. 1, the remote client 102 shown in FIG. 2, and the remote server 106 shown in FIG. 3.

At block 502, a remote session is established between a remote client and a remote server, such as the remote client 102 and the remote server 106. The remote session can be established using an application on the remote client, such as the remote connection agent 212. The remote session can be established over a secure communication protocol generally used by the remote client to communicate with the remote server.

In an implementation, the remote client 102 can be a terminal server client, the remote server 106 can be a terminal server and the remote connection agent 212 can be a TS client application such as mstsc.exe. The remote session can be then established over remote desktop protocol (RDP) that is generally used by a terminal server client to communicate with a terminal server. The remote session can also be established over a virtual channel such as a socket communication protocol.

At block 504, test inputs for testing a component in the remote session are sent to plug-ins associated with the component, such as plug-ins 314, to implement and monitor the testing. The component can be an application or a device and can be associated with the remote client or the remote server.

The test inputs can be provided by the test applications 108 to the remote connection agent 212, which in turn sends the test inputs to a test agent 110. The test agent 110 can include the plug-ins 314, which can communicate with the component in the remote session. The remote connection agent 212 can also communicate directly with the plug-ins 314 in the test agent 110 and can send the test inputs directly to the plug-ins 314.

The plug-ins 314 can include plug-ins, which are component specific or are associated with two or more components. Moreover, plug-ins for new components or modified components can be added directly to the test agent 110. The new components or modified components can be tested using the added plug-ins in the same manner of testing as existing components.

At block 506, the plug-ins associated with the component under test conduct and monitor tests using the test inputs. For example, tests that can be conducted include file redirection test, audio test, print test, input/output test, etc. The plug-ins 314 can also generate test reports that include details of how the tests were conducted and the results obtained.

At block 508, the test reports are sent to the test applications 108. The test reports can be provided by the plug-ins 314 to the test agent 110, which in turn sends the test reports to the remote connection agent 212. The plug-ins 314 can also directly send the test reports to the remote connection agent 212. The remote connection agent 212 can send the test reports to the test applications 108. The test applications 108 can store the test reports for future reference. In addition, the test applications 108 can generate further test inputs based on the test reports.

It will be understood that testing of a component can be conducted iteratively by repeating process 500 such that test inputs are generated based on test reports from a previous test. Also, test agent 110 can conduct tests on multiple components simultaneously. In addition, the multiple components may be tested based on test inputs received from different remote clients.

Exemplary Computer Environment

Figure 6:
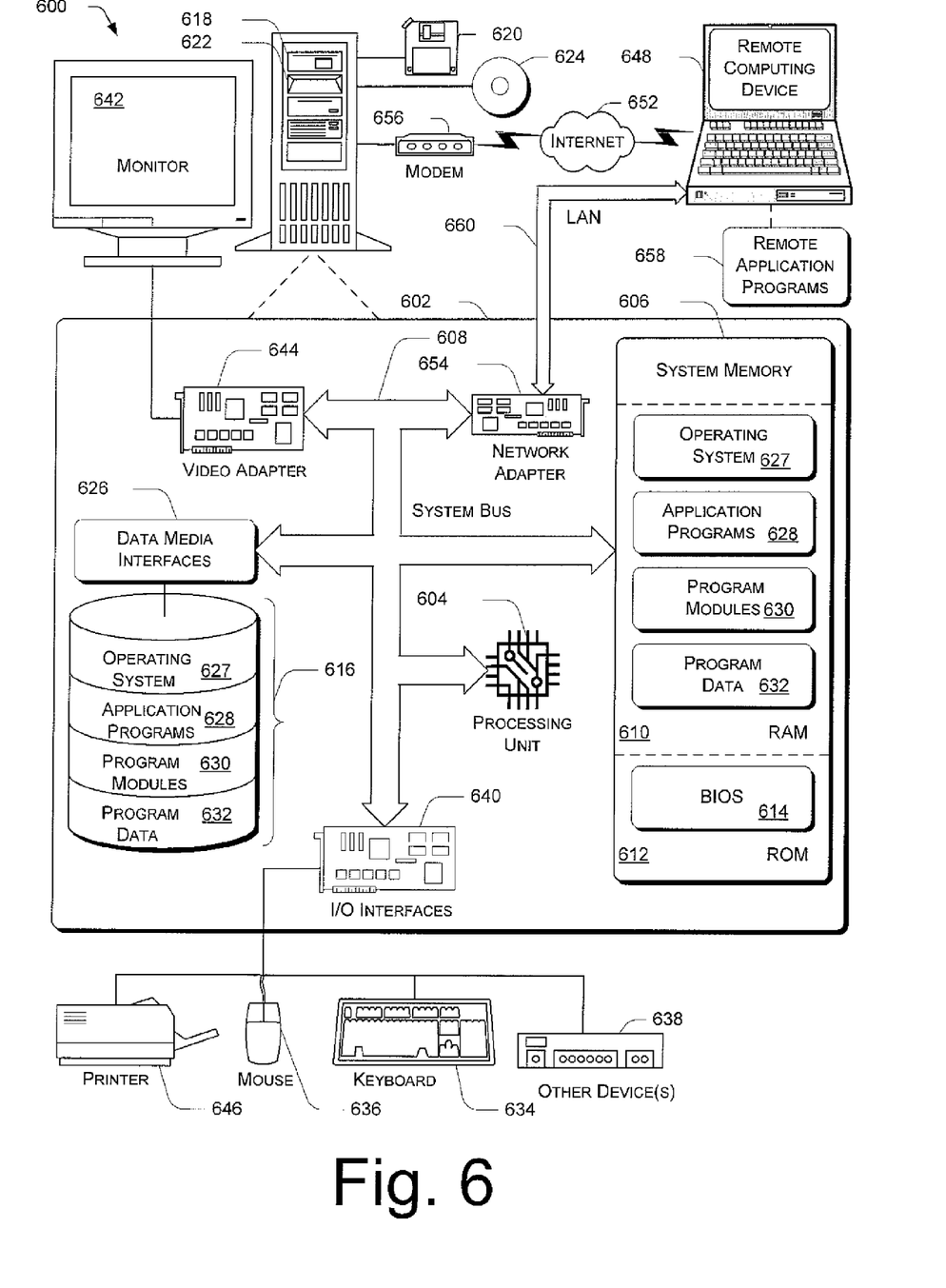
FIG. 6 is an illustration of an exemplary computer environment.

FIG. 6 illustrates an exemplary general computer environment 600, which can be used to implement the techniques described herein, and which may be representative, in whole or in part, of elements described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing-based device in the form of a computer 602. Computer 602 can be, for example, a desktop computer, a handheld computer, a notebook or laptop computer, a server computer, a game console, and so on. The components of computer 602 can include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCT) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, nonvolatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternately, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 627, one or more application programs 628, other program modules 630, and program data 632. Each of such operating system 627, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing-based device 648. By way of example, the remote computing-based device 648 can be a personal computer, portable computer, a server, a router, a network computer, a peer device or other common network node, and the like. The remote computing-based device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing-based device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

The above-described methods and system describe automation of testing in remote sessions. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A client computing device comprising:
    a memory;
    one or more processors operatively coupled to the memory;
    a remote connection agent stored in the memory, wherein the remote connection agent establishes a remote session with a server; and
    one or more test applications stored in the memory that provide a framework conducting component testing on the remote session, wherein the component testing is supported by component specific plug-ins, wherein the plug-ins support multiple component testing.

2. The client computing device of claim 1, wherein remote session is established on a virtual channel that handles custom data formats independently from a communication protocol.

3. The client computing device of claim 1, wherein remote session leverages an existing communication protocol between the client computing device and the server.

4. The client computing device of claim 1, wherein the remote connection agent receives test inputs from the one or more test applications in conducting component testing.

5. The client computing device of claim 4, wherein the test inputs are communicated to a test agent resident at the server that monitors the functioning of the component testing.

6. The client computing device of claim 1, wherein test reports are received from the server.

7. A server comprising:
    a memory;
    one or more processors operatively coupled to the memory; and
    a test agent stored in the memory, wherein the test agent includes one or more plug-ins used for component specific testing between the server and one or more remote client devices, wherein the plug-ins support multiple component testing.

8. The server of claim 7, wherein the plug-ins relate to a component to implement testing and monitoring of functioning of the component.

9. The server of claim 7, wherein the plug-ins include one or more of the following: a printer test, a redirection test, an auto-reconnect, and an audio test.

10. The server of claim 7, wherein the test agent uses the plug-ins to generate a test report.

11. The server of claim 7, wherein one or more plug-ins are added to the test agent to support a modified component testing.

12. A method comprising:
    establishing a remote session with one or more computing devices;
    sending test inputs for testing a component to component specific plug-ins; and
    conducting the testing of the component using the component specific plug-ins, wherein the plug-ins support multiple component testing.

13. The method of claim 12, wherein the establishing is over a secure communication protocol used by the one or more computing devices to communicate with a server.

14. The method of claim 12, wherein the establishing is over a virtual channel between the one or more computing devices and a remote server.

15. The method of claim 12, wherein the test inputs are provided by test applications to a test agent that includes the component specific plug-ins.

16. The method of claim 12 further comprising generating a test report from the testing of the component.

17. The method of claim 16, wherein the test report is sent to the one or more computing devices.

18. The method of claim 16, wherein the test report is used to generate further tests inputs.

* * * * *